United States Patent [19]

Browning et al.

[11] 4,290,207

[45] Sep. 22, 1981

[54] SURVEYING INSTRUMENT

[76] Inventors: James S. Browning, 19004 Groverdale, Covina, Calif. 91722; Peter F. Pfeiler, 2241 Ardsheal Dr., La Habra Hts., Calif. 90631; Vernon Lowery, 1731 E. Vermont, Anaheim, Calif. 92805

[21] Appl. No.: 127,826

[22] Filed: Mar. 6, 1980

[51] Int. Cl.³ ............................................. G01C 15/08
[52] U.S. Cl. ..................................... 33/295; 248/187
[58] Field of Search ................. 33/290, 293, 294, 295, 33/296; 248/163, 165, 187, 168

[56] References Cited

U.S. PATENT DOCUMENTS

| | | | |
|---|---|---|---|
| 2,169,533 | 8/1939 | Kasten | 33/295 |
| 3,300,165 | 1/1967 | O'Kane | 248/168 |
| 3,685,162 | 8/1972 | Haun | 33/295 |
| 3,755,905 | 9/1973 | Blubaugh et al. | 33/293 |
| 3,857,639 | 12/1974 | Mason | 33/290 |
| 4,192,076 | 3/1980 | Hall | 33/296 |

Primary Examiner—Steven L. Stephan
Attorney, Agent, or Firm—Edgar W. Averill, Jr.

[57] ABSTRACT

A device for holding a surveying instrument plumb and level. The device is attached to a tripod, and a clamp holds a slide bar which, in turn, is affixed to a clip bar. A range pole or other surveying instrument is held by the clip bar and a level is also affixed to the clip bar.

12 Claims, 9 Drawing Figures

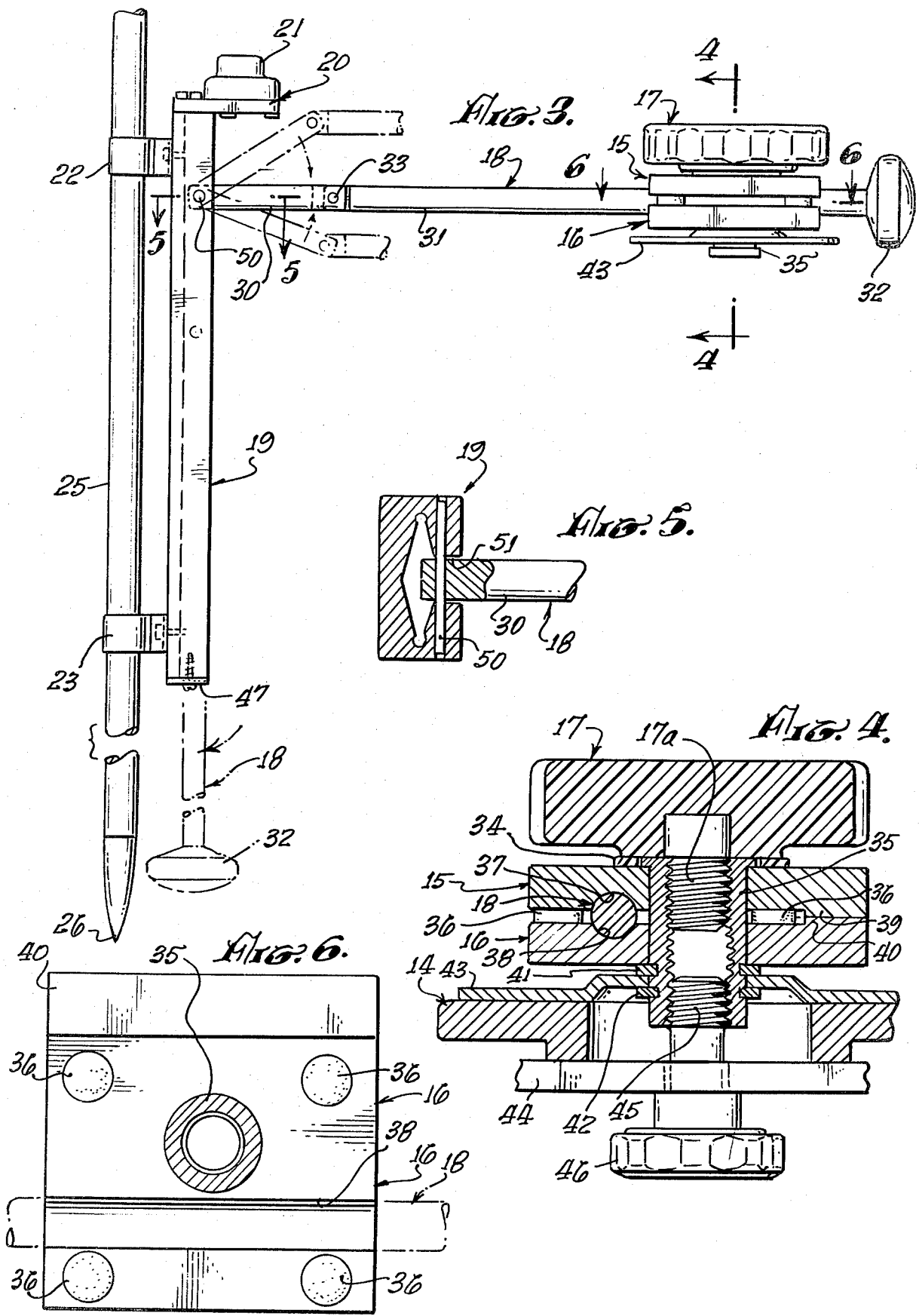

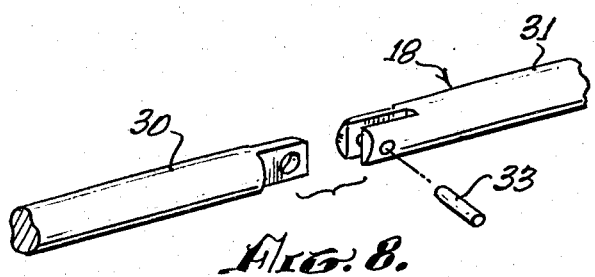
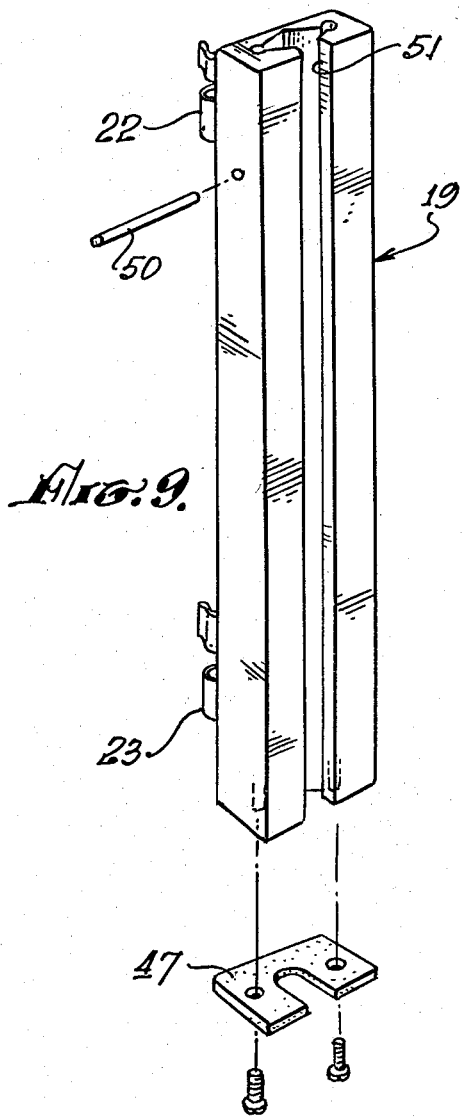
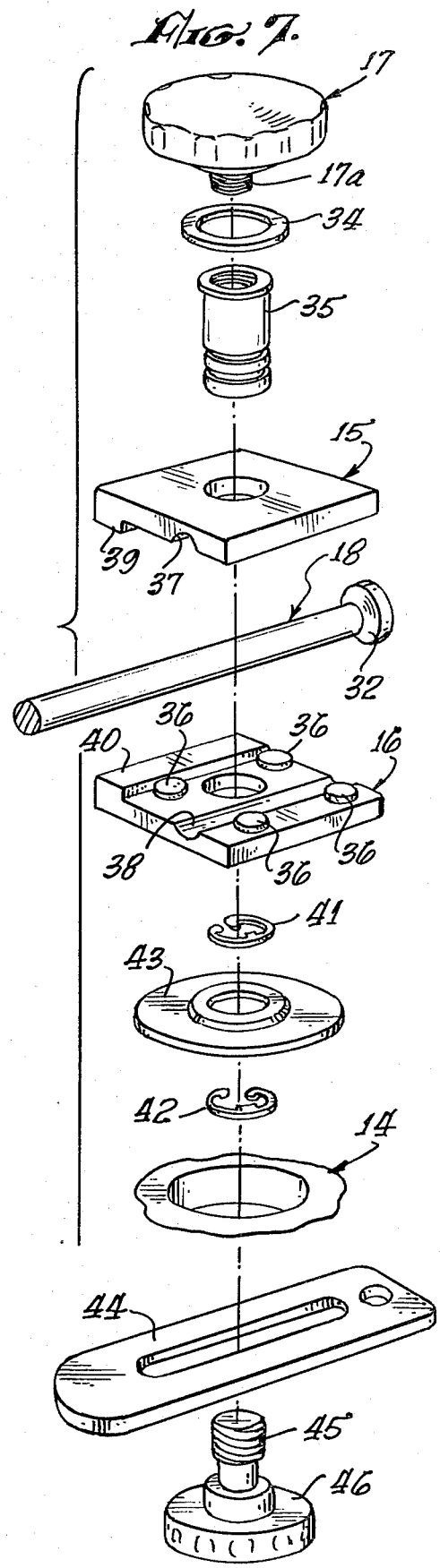

SURVEYING INSTRUMENT

BACKGROUND OF THE DISCLOSURE

The field of the invention is surveying instruments and the invention relates more particularly to devices for holding a range pole or other surveying instrument in a plumb and level position.

In the past, leveling and plumbing have been carried out by the use of a tribrach which has a base plate which is affixed to the tripod and three foot screws which are adjusted to level whatever instrument might be held in the tribrach. Such a method is time consuming and the equipment for carrying it out is relatively expensive. Thus, a device which can level and plumb a surveying instrument such as a range pole quickly and easily is needed.

SUMMARY OF THE INVENTION

The present invention is for a device for holding a surveying instrument plumb and level. The device has means for attachment to a tripod. Clamp means are affixed to the means for attachment and the clamp means have a lower plate having a groove formed therein and an upper plate also having a groove formed therein. Tightening means abut the upper and lower plates for urging these two plates together and for holding them together in a tightened relationship. The clamp means permits the rotational movement of the upper and lower plates with respect to the tripod. A slide bar is held between the grooves in the upper and lower plate, and a clip bar is hingedly held by the slide bar. The clip bar has a level indicating means affixed thereto and clip means for holding a surveying instrument. The orientation of the surveying instrument held by the clip bar can be adjusted in a north/south direction by the longitudinal movement of the slide bar and in the east/west direction by the rotation of the clamp means (assuming the slide bar is oriented in a north-/south direction). The entire assembly may be tightened by the tightening of the clamp means. In a preferred embodiment, the slide bar is hinged between the clamp and the clip means.

BRIEF DESCRIPTION OF THE DRAWINGS

FIG. 3 is a side-elevational view of the device of FIG. 1.

FIG. 4 is an enlarged, fragmentary cross-sectional view taken along line 4—4 of FIG. 3.

FIG. 5 is an enlarged, fragmentary view, partly in cross-section, taken along line 5—5 of FIG. 3.

FIG. 6 is an enlarged, cross-sectional view taken along line 6—6 of FIG. 3.

FIG. 7 is an exploded view of the components of the device of FIG. 1.

FIG. 8 is a perspective view of the joint between the two parts of the slide bar of the device of FIG. 1.

FIG. 9 is a perspective view of the clip bar of the device of FIG. 1.

DESCRIPTION OF THE PREFERRED EMBODIMENTS

Figure 1:
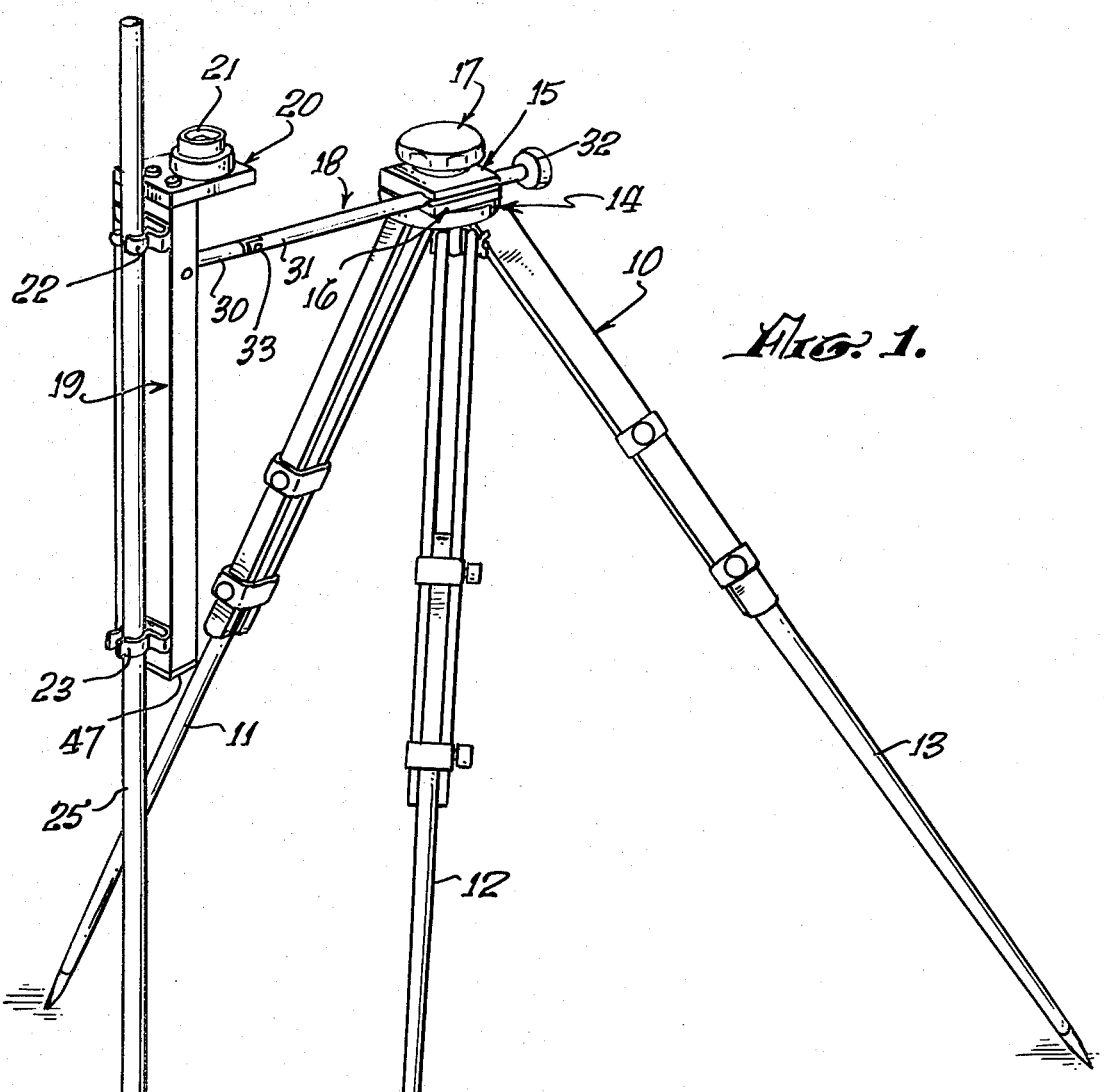
FIG. 1 is a perspective view of the device of the present invention mounted on a tripod.

The device of the present invention is shown in FIG. 1 attached to a conventional tripod which is indicated generally by reference character 10. Tripod 10 has legs 11, 12 and 13 which support a conventional mounting plate 14. The device of the present invention is held to mounting plate 14. The major components of the device of the present invention consist of an upper plate 15, a lower plate 16, a tightening knob 17, a slide bar 18, a clip bar 19, a level platform 20, a level bubble 21 and a pair of clips 22 and 23. A range pole 25 has a point 26 which is supported by the ground and range pole 25 is held to the surveying device by clips 22 and 23.

Figure 2:
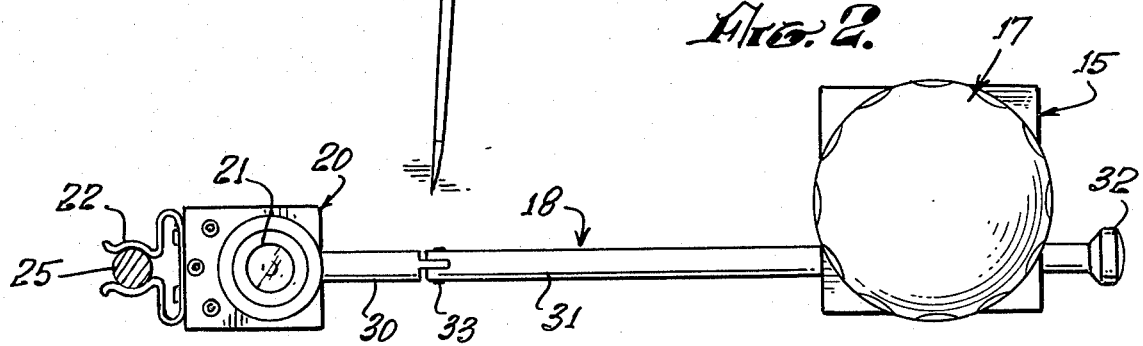
FIG. 2 is a top plan view of the device of FIG. 1.

The device is shown in a plan view in FIG. 2, the level 21 is of the type having circular marks on the top for the centering of a bubble thereof so that the platform 20 may readily be moved to a horizontal position by the moving and turning of the slide bar as described in more detail below. Slide bar 18 may be fabricated in two parts, 30 and 31, which are hinged together and held one to the other by a pin 33. A knob 32 is affixed to slide bar 18 and assists in the leveling and plumbing of the clip bar 19. Knob 32 also prevents the slide bar from falling out of the upper and lower plates when knob 17 is loosened.

The elements of the clamping mechanism are shown best in the exploded view of FIG. 7. The tightening knob 17 has a lower surface which abuts against plastic ring 34 which in turn rests against upper plate 15. Plastic ring 34 should be made of a plastic having a surface with a low coefficient of friction such as the polymers sold under the Trademark Nylon and Teflon. Knob 17 has a lower threaded stud 36 which screws into threaded sleeve 35. Four rubber spacers 36 are held between upper plate 15 and lower plate 16 and serve to urge the two plates apart so that when knob 17 is loosened, the upper and lower plates will separate facilitating the movement of slide bar 18. Upper plate 15 has a semi-circular groove 37, which groove could alternatively be V-shaped, it being only necessary that it securely hold and permit the longitudinal movement of slide bar 18 therein. Similarly, lower plate 16 has a groove 38 formed therein. Upper plate 15 also has a shoulder 39 which abuts against shoulder 40 of lower plate 16. A pair of "E" clips 41 and 42 hold a centering washer 43 onto threaded sleeve 35. A slotted bar 44 is pivotally held below mounting plate 14 and a threaded stud 45 is turned by knob 46 which stud is screwed into sleeve 35 to hold the assembly securely in mounting plate 14.

The elements shown in FIG. 7 in exploded view are shown assembled in FIG. 4. It can be seen that the tightening of knob 17 forces plastic ring 34 tp push downwardly on upper plate 15 which causes the groove 37 and upper plate 15 to push downwardly on slide bar 18. Similarly, groove 38 of lower plate 16 pushes upwardly on slide bar 18 which is thus securely held between the plates when knob 17 is tightened. The rubber spacers 36 tend to urge grooves 37 and 38 away from one another when knob 17 is loosened thereby facilitating the movement of slide bar 18 when the knob is loosened. Lower plate 16 is shown in plan view in FIG. 6 and rubber spacers 36 are affixed to the upper surface thereof. As shown best in FIG. 3, slide bar 18 is affixed to clip bar 19 by hinge pin 50 which is also shown in FIG. 5. This connection, of course, permits the rotation of clip bar 19 with respect to slide bar 18. The two lengths 30 and 31 of slide bar 18 may be pivoted about pin 33 as shown in phantom lines in FIG. 3. Level 21 may be affixed to platform 20 by adjustable screws to perform a final adjustment of the level with respect to the clip bar. For instance, clip bar 19 could be affixed to a rod which is known to be vertical and the screws holding level 21 could be adjusted so that the level of level 21 is centered.

The range pole 25 is affixed to clip bar 19 by clips 22 and 23 which are preferably of a type which are referred to as spring clips so that different surveying instruments or range poles may be inserted therein very easily. Also, the vertical positioning of range pole 25 with respect to clip bar 19 can readily be changed by such spring clips. Clips 22 and 23 are preferably coated with a layer of poly-vinyl chloride to securely hold rang pole 25 and also to reduce the scratching of pole 25. Other clips, however, may be used with the clip bar of the present invention.

As mentioned above, slide bar 18 may be made from two separate parts 30 and 31 which are hinged together as shown best in FIG. 8 of the drawings. It has been found that by providing a pivoting hinge in slide bar 18, the tendency to lift slide bar 18 when knob 17 is tightened may be eliminated. For instance, referring to FIG. 1, when point 26 of range pole 25 is placed on the ground and clipped to clip bar 19, the range pole may be made plumb by centering the bubble of level 21. After this has been leveled, knob 17 is tightened. If the slide bar has no hinge point, this tightening action tends to raise the end of the slide bar slightly and to lift point 26 above the ground. This can result in a movement of range pole 25 so that it is no longer plumb. Therefore, the hinging of slide bar 18 provides an important aspect of the present invention.

If we assume that slide bar 18 is oriented so that it is facing north, it can be seen that the longitudinal movement of slide bar 18 in grooves 37 and 38 will move the top of the range pole in a north/south direction (assuming the point 26 is held at one point on the ground). It can also be seen that the rotation of upper and lower plates 15 and 16 will cause the range pole to move in an east/west direction. Therefore, the combination of rotation and longitudinal movement of slide bar 18 permits the adjustment of range pole 25 to a plumb and level position. Loosening knob 17 permits both the rotational and longitudinal movement required for movement in all directions, thereby making adjustment especially easy. It is preferable that point 26 be securely supported by the ground as this provides not only vertical support, but also provides a point of pivoting for the range pole during adjustment. The knob 32 attached to slide bar 18 further facilitates the operation of the device of the present invention.

The clip bar is shown in perspective view in FIG. 9. Clip bar 19 has a central slot 51 which permits the slide bar to be folded into the clip bar to provide a compact assembly. A detent plate 47 may be affixed to the bottom of clip bar 19 to hold the slide bar in central slot 51.

Materials of construction are not critical, although it is preferred that aluminum be used for clip bar and the upper and lower plates. The slide bar should preferably be stainless steel and the rubber spacers should be made from a material having excellent resiliency such as natural rubber. While the present invention has been discussed in terms of leveling and plumbing a range pole, it may, of course, be used to level and plumb other devices.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. A device for holding a surveying instrument plumb and level, said device comprising:
    means for attachment to tripod means;
    clamp means affixed to said means for attachment, said clamp means having a lower plate having a groove formed therein, an upper plate having a groove formed therein, tightening means abutting said upper and lower plates for urging said upper and lower plates together and for holding them together in a tightened relationship, said clamp means permitting rotation of the upper and lower plates with respect to the tripod means when said clamp means are in a loosened condition;
    a slide bar held between said grooves; and
    a clip bar hingedly held by said slide bar, said clip bar having level indicating means affixed thereto and having clip means for holding a surveying instrument, whereby the orientation of a surveying instrument held by said clip bar can be adjusted in a north/south direction by the longitudinal movement of the slide bar in said clamp means and in an east/west direction by the rotation of the upper and lower plates with respect to the tripod means.

2. The device of claim 1 wherein said slide bar is formed in two parts hinged together by hinge means positioned between the clip bar and the upper and lower plates.

3. The device of claim 1 wherein said level indicating means is a bubble level.

4. The device of claim 1 wherein elastic means are positioned between the upper and lower plates to urge them apart when said clamp means are in a loosened configuration.

5. The device of claim 4 wherein said elastic means comprise a plurality of rubber members.

6. The device of claim 5 wherein said rubber members are positioned on both sides of said groove.

7. The device of claim 6 wherein there are four said rubber members, two of which are positioned on each side of said groove.

8. The device of claim 1 wherein said clamp means includes a threaded stud with a knob affixed thereto, said knob having a lower shoulder which forces the upper plate toward the lower plate.

9. The device of claim 1 wherein the upper and lower plates have a shoulder formed near the edge which is affixed opposite the side on which the groove is positioned.

10. The device of claim 1 wherein said clip means are baised clamp means.

11. The device of claim 1 wherein said slide bar protudes beyond said clamp means in the direction away from said clip bar.

12. The device of claim 11 wherein the terminus of said slide bar away from said clip bar has a knob affixed thereto.

* * * * *